(12) United States Patent
Menon et al.

(10) Patent No.: US 12,240,123 B2
(45) Date of Patent: *Mar. 4, 2025

(54) ROBOTIC KITTING MACHINE

(71) Applicant: Dexterity, Inc., Redwood City, CA (US)

(72) Inventors: Samir Menon, Atherton, CA (US); Ivan Alberto Trujillo Priego, San Francisco, CA (US); Talbot Morris-Downing, Redwood City, CA (US); Zhouwen Sun, Redwood City, CA (US); Kevin Jose Chavez, Redwood City, CA (US); Alberto Leyva Arvayo, Palo Alto, CA (US); Cyril Nader, Palo Alto, CA (US); Farshid Farhat, Santa Clara, CA (US)

(73) Assignee: Dexterity, Inc., Redwood City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/202,524

(22) Filed: May 26, 2023

(65) Prior Publication Data

US 2023/0302644 A1   Sep. 28, 2023

Related U.S. Application Data

(63) Continuation of application No. 17/068,572, filed on Oct. 12, 2020, now Pat. No. 11,701,776.

(Continued)

(51) Int. Cl.
*B25J 9/16*   (2006.01)
*B25J 13/08*   (2006.01)

(52) U.S. Cl.
CPC .......... *B25J 9/1664* (2013.01); *B25J 9/1633* (2013.01); *B25J 9/1679* (2013.01); *B25J 9/1687* (2013.01);

(Continued)

(58) Field of Classification Search
CPC ...... B25J 9/1664; B25J 9/1633; B25J 9/1679; B25J 9/1687; B25J 9/1694; B25J 13/085;

(Continued)

(56) References Cited

U.S. PATENT DOCUMENTS

| | | |
|---|---|---|
| 4,894,908 A | 1/1990 | Haba, Jr. |
| 5,457,773 A | 10/1995 | Jeon |

(Continued)

FOREIGN PATENT DOCUMENTS

| | | |
|---|---|---|
| CN | 104020769 | 2/2017 |
| CN | 107175672 | 9/2017 |

(Continued)

*Primary Examiner* — Ian Jen
*Assistant Examiner* — Karston G. Evans
(74) *Attorney, Agent, or Firm* — Van Pelt, Yi & James LLP

(57) ABSTRACT

A robotic kitting machine is disclosed. In various embodiments, a robotic arm is used to move an item to a location in proximity to a slot into which the item is to be inserted. Force information generated by a force sensor is received via a communication interface. The force sensor information is used to align a structure comprising the item with a corresponding cavity comprising the slot, and the item is inserted into the slot.

20 Claims, 7 Drawing Sheets

Related U.S. Application Data

(60) Provisional application No. 62/926,168, filed on Oct. 25, 2019.

(52) U.S. Cl.
CPC ............ *B25J 9/1694* (2013.01); *B25J 13/085* (2013.01); *G05B 2219/39322* (2013.01); *G05B 2219/39529* (2013.01); *G05B 2219/40032* (2013.01); *G05B 2219/45063* (2013.01)

(58) Field of Classification Search
CPC .................. B25J 11/00; B25J 13/006; G05B 2219/39322; G05B 2219/39529; G05B 2219/40032; G05B 2219/45063; G05B 2219/40013
See application file for complete search history.

(56) References Cited

U.S. PATENT DOCUMENTS

| | | |
|---|---|---|
| 6,141,863 A | 11/2000 | Hara |
| 6,202,004 B1 | 3/2001 | Valerino, Sr. |
| 7,654,393 B1 | 2/2010 | Carberry |
| 9,682,476 B1 | 6/2017 | Prats |
| 9,750,170 B2 | 8/2017 | Hu |
| 10,875,194 B1 | 12/2020 | Coleman |
| 10,953,549 B2 | 3/2021 | Diankov |
| 11,267,126 B2 | 3/2022 | Asano |
| 2008/0312769 A1 | 12/2008 | Sato |
| 2010/0204824 A1 | 8/2010 | Luce |
| 2015/0234375 A1 | 8/2015 | Takayama |
| 2016/0052135 A1 | 2/2016 | Motoyoshi |
| 2017/0151666 A1 | 6/2017 | Kobayashi |
| 2017/0259431 A1 | 9/2017 | Takeuchi |
| 2017/0334646 A1 | 11/2017 | High |
| 2018/0029234 A1 | 2/2018 | Junya |
| 2018/0339414 A1 | 11/2018 | Taguchi |
| 2019/0160666 A1 | 5/2019 | Pollack |
| 2019/0270207 A1 | 9/2019 | Motowaki |
| 2019/0280405 A1 | 9/2019 | Iwai |
| 2019/0344447 A1 | 11/2019 | Wicks |
| 2020/0233395 A1 | 7/2020 | Matsumoto |
| 2020/0286192 A1 | 9/2020 | Roy |
| 2021/0044070 A1* | 2/2021 | Graber-Tilton ........ B25J 19/023 |
| 2022/0306402 A1 | 9/2022 | Sun |

FOREIGN PATENT DOCUMENTS

| | | |
|---|---|---|
| CN | 107443375 | 11/2019 |
| CN | 108608425 | 11/2020 |
| CN | 106272416 | 12/2020 |
| CN | 106994680 | 9/2021 |
| CN | 110253564 | 5/2022 |
| DE | 102018003270 | 10/2019 |
| JP | 2514404 Y2 | 5/1991 |
| JP | H0679546 | 10/1994 |
| JP | 2000354919 | 12/2000 |
| JP | 2004249378 A | 9/2004 |
| JP | 2013154446 A | 8/2013 |
| JP | 2013154449 A | 8/2013 |
| JP | 2014024576 | 2/2014 |
| JP | 2014188640 | 10/2014 |
| JP | 2016043455 | 4/2016 |
| JP | 2017052049 | 3/2017 |
| JP | 2017100197 | 6/2017 |
| JP | 2019520994 A | 7/2019 |
| JP | 2019182561 A | 10/2019 |
| KR | 19980039103 | 8/1998 |
| WO | 2015118171 | 8/2015 |
| WO | 2015118266 | 8/2015 |
| WO | 2019146007 | 8/2019 |
| WO | 2019183141 | 9/2019 |

* cited by examiner

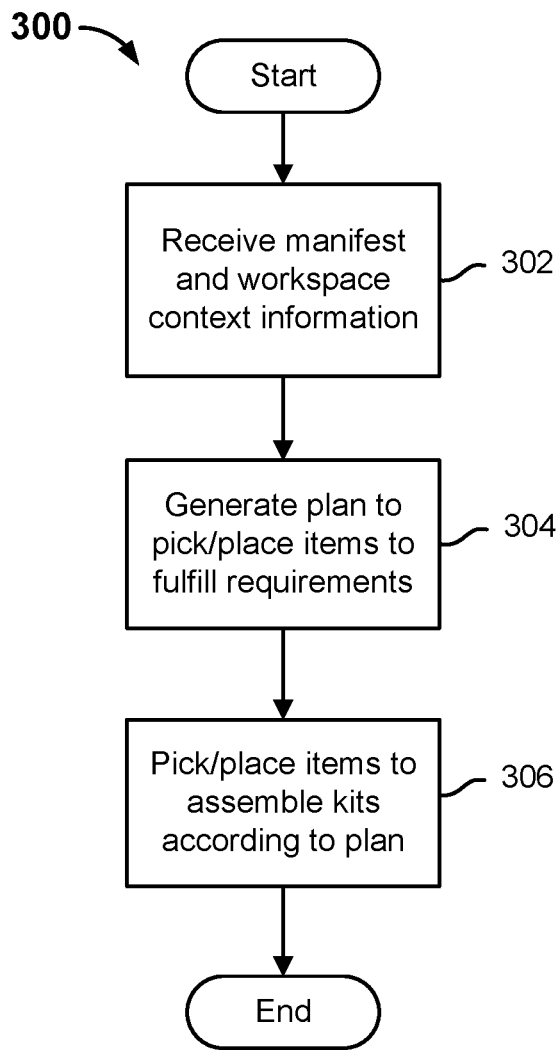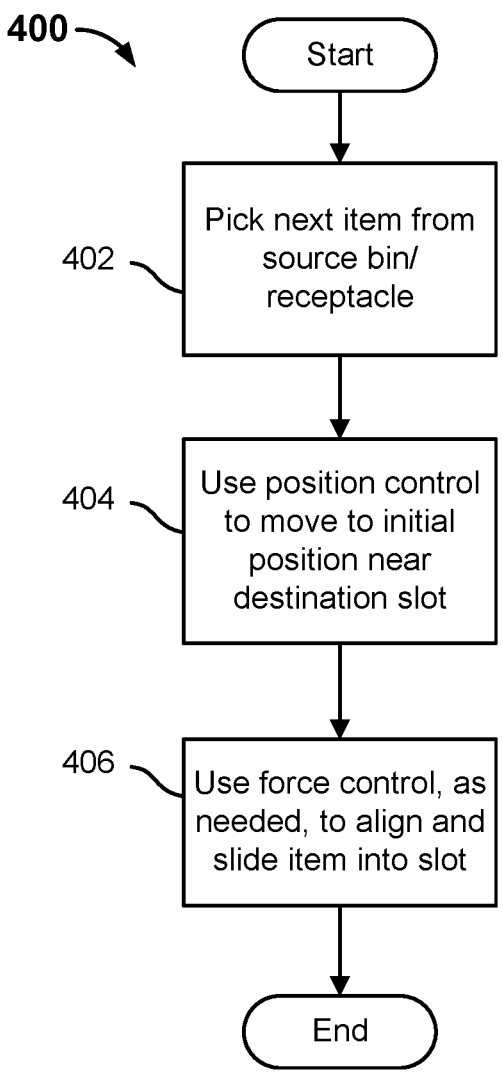
FIG. 3
FIG. 4

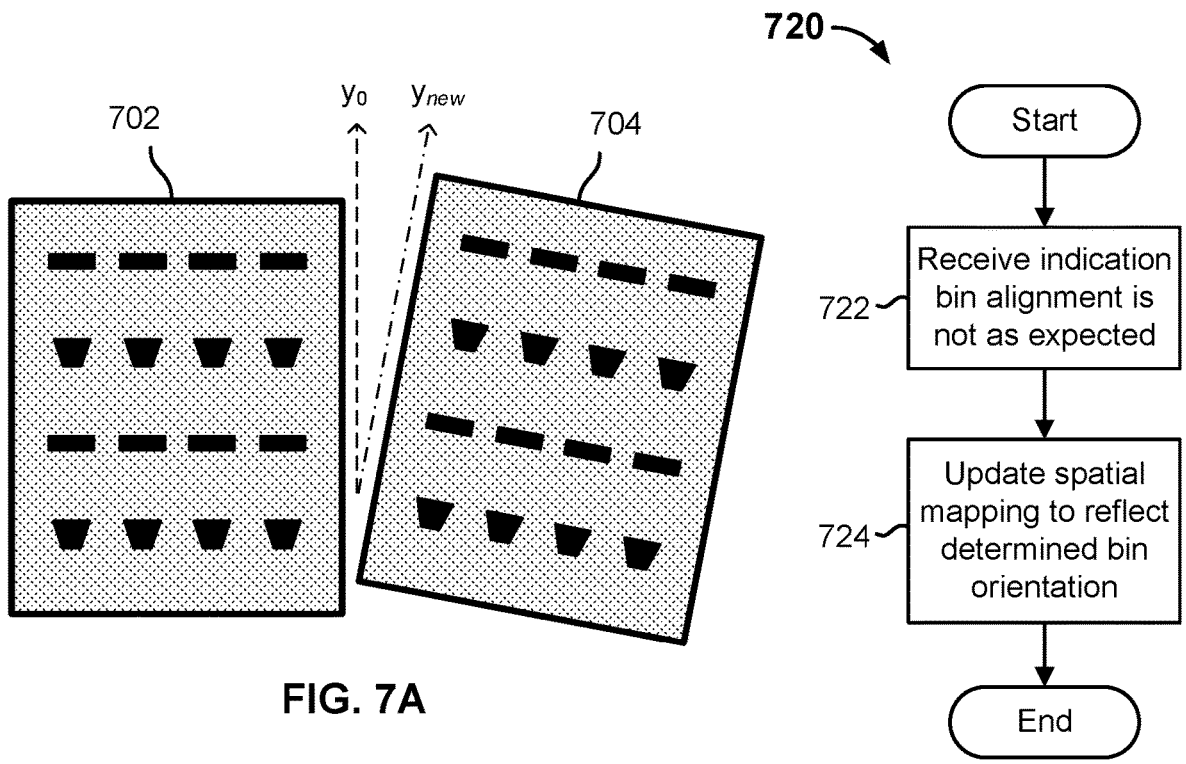
FIG. 7A
FIG. 7D
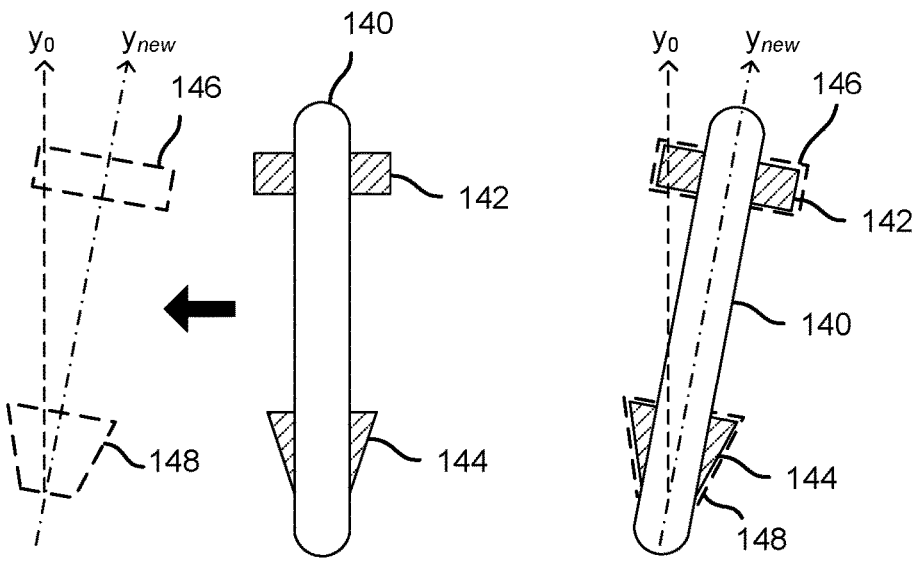
FIG. 7B
FIG. 7C

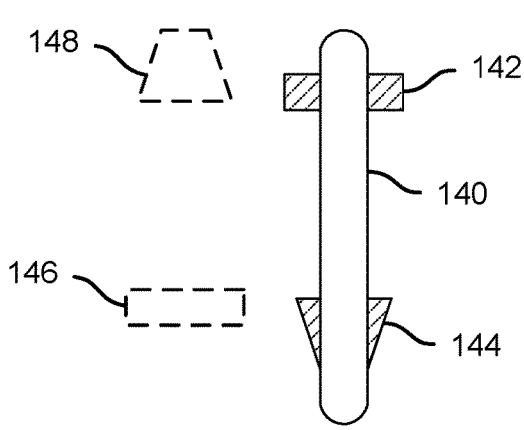
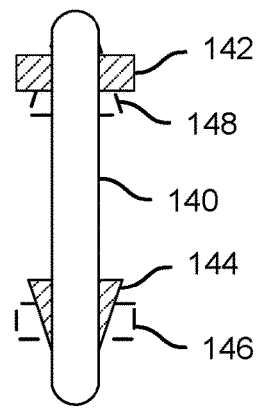
FIG. 8A  FIG. 8B
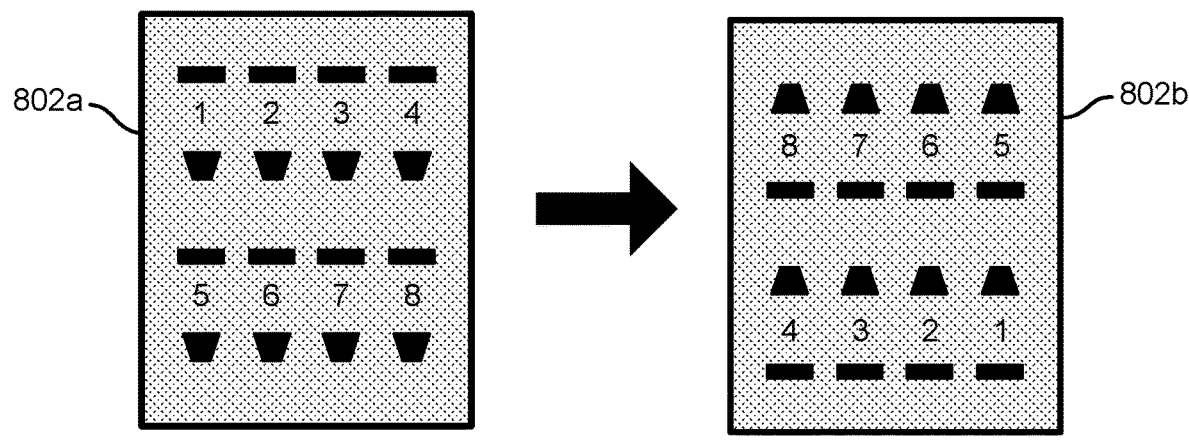
FIG. 8C
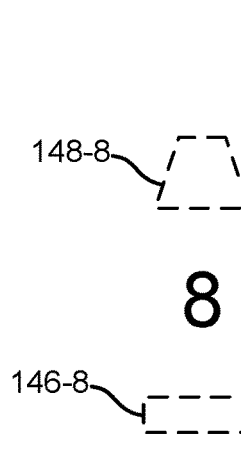
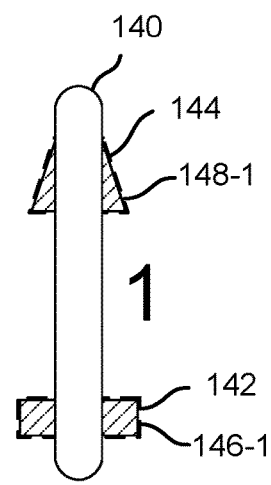
FIG. 8D  FIG. 8E

ROBOTIC KITTING MACHINE

CROSS REFERENCE TO OTHER APPLICATIONS

This application is a continuation of U.S. patent application Ser. No. 17/068,572 entitled ROBOTIC KITTING MACHINE filed Oct. 12, 2020, which claims priority to U.S. Provisional Patent Application No. 62/926,168 entitled ROBOTIC KITTING MACHINE filed Oct. 25, 2019, each of which is incorporated herein by reference for all purposes.

BACKGROUND OF THE INVENTION

Industrial robots have been used to perform a variety of tasks, including tasks involving heavy lifting and performing tasks in environments or with materials that might be unhealthy for humans.

Certain tasks have continued to be performed primarily by humans, including tasks involved fine motor control, fragile items, irregularly shaped items, etc. It is more challenging to design and program robots to perform such tasks.

Manufacturing processes, such as automobile or other assembly lines, may include assembling parts of various shapes, sizes, materials, weights, etc. Parts may arrive in bulk, such as boxes or bins, and be staged in locations near the assembly line.

A common approach is to assembly in a work area "kits" of parts to be provided to workers (humans, robots, etc.) on the main assembly line to be added to a main product being assembled on the line. For example, door handles to be affixed to doors on a main automobile assembly line may be arranged in kits in a work area to match to models (e.g., 2-door, 4-door, etc.) and/or colors being assembled on the line. Bins or carriers full of door handles of the same style/color may be provided, e.g., from a supplier, and kits including various styles/colors of handle may be assembled to be taken to the door and/or vehicle assembly line.

In a further example, kits each comprising a prescribed mix of parts, each part being drawn from a source receptacle containing only that part, may be assembled in another location to create a final product or a subassembly to be integrate into a final product. In another example, parts from different source receptacles may be assembled into kits which are packaged and shipped to a remote destination for assembly, such as a kit of parts to be included in an assemble-at-home furniture or other item.

Parts may be fragile and/or may have a finish that could be damaged by mishandling. In a manufacturing facility or similar setting, parts may be assembled into a tote or other carrier to be transported, with lower risk of being damaged in transit, to a work area in which the parts are to be used. Such a tote may include an insert with slots to receive individual parts, to hold the parts securely and avoid their being damaged by being knocked together, e.g., as the tote or other carrier is moved from the location at which the mixed-color (or style) kit is assembled to the line at which the parts will be added to a larger assembly, such as a vehicle door in the case of door handles. The slots may have tight tolerances, to protect the parts, which may make it challenging for a robotic system to insert parts into the slots.

BRIEF DESCRIPTION OF THE DRAWINGS

Various embodiments of the invention are disclosed in the following detailed description and the accompanying drawings.

FIG. 3 is a flow diagram illustrating an embodiment of a process to perform a robotic kitting operation.

FIG. 4 is a flow diagram illustrating an embodiment of a process to place items in corresponding locations in a receptacle.

FIGS. 7A through 7C illustrate placement of an item in a corresponding location in a receptacle in an embodiment of a robotic kitting system.

FIG. 7D is a flow diagram illustrating an embodiment of a process to place items in corresponding locations in a receptacle in an embodiment of a robotic kitting system.

FIGS. 8A through 8E illustrate placement of an item in a corresponding location in a receptacle in an embodiment of a robotic kitting system.

DETAILED DESCRIPTION

Figure 1A:
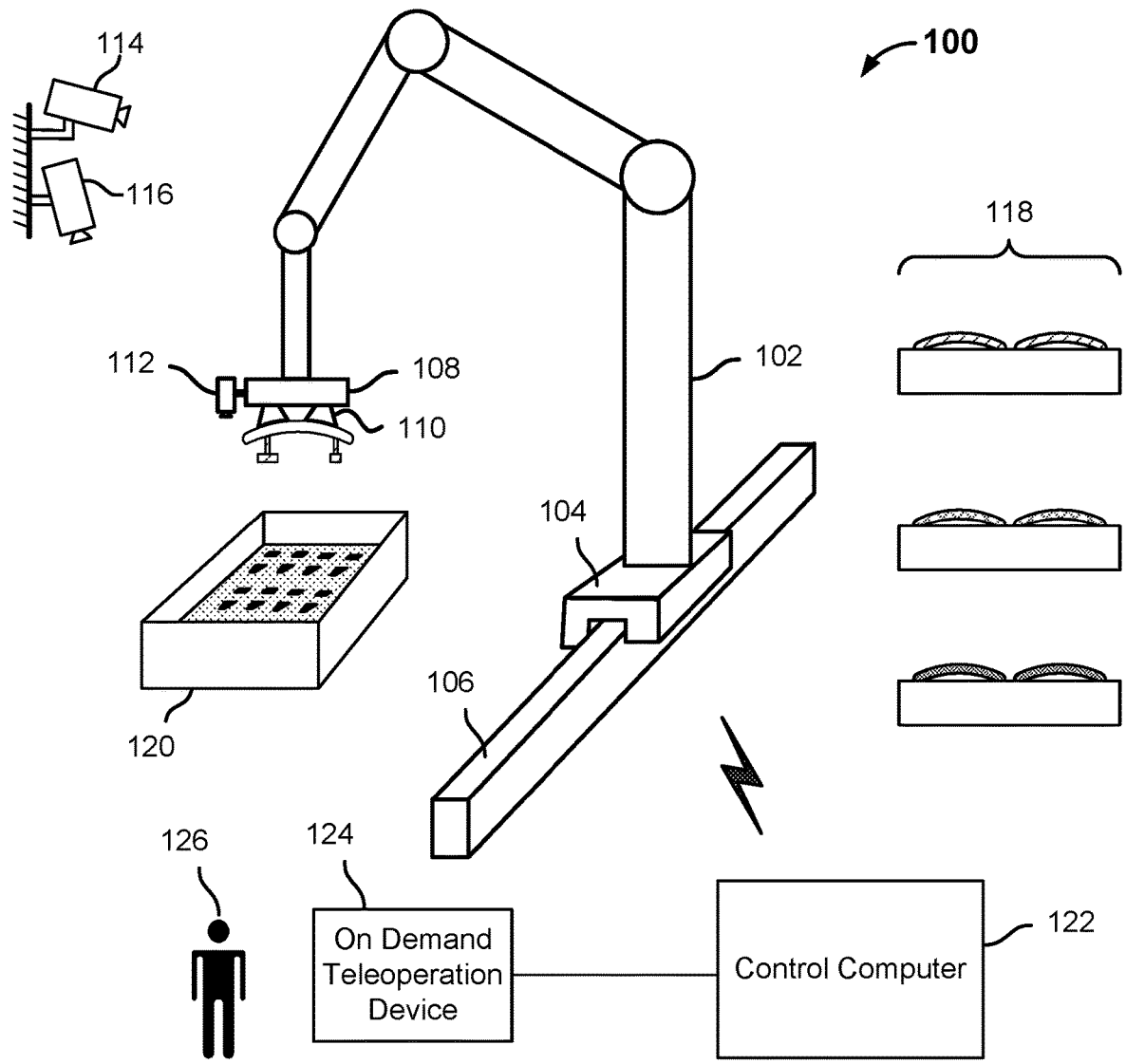
FIG. 1A is a block diagram illustrating an embodiment of a robotic kitting machine.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A robotic kit assembly system is disclosed. In various embodiments, a robotic system as disclosed herein assembles a kit that includes a prescribed variety of parts (e.g., door handles of prescribed different colors). The robotic system places each part in a corresponding "slot" or defined location in a tote or other carrier in which the kits is assembled.

In various embodiments, a robotic system as disclosed herein receives a manifest or other data identifying the parts to be included in a kit. For example, a tote may hold 12 door handles and the robotic system may receive an identification of 6 colored pairs of door handle to be included in the kit. The system may receive a set of manifests to build successive totes, each having a prescribed number and mix of parts. The robotic system receives configuration information and/or otherwise receives data indicating the location of source bins or totes each having a part of a given style and/or color. The robotic system formulates and executes a plan to retrieve the parts identified in the manifest and place each in a corresponding location in the tote in which the kit is being assembled.

In various embodiments, one or more of position control, force control, and computer vision-based control (e.g., from 2D and/or 3D cameras providing image and/or depth data) to pick and place items as needed to assemble the kit without human intervention.

In various embodiments, position control is used to move a part to a location near the slot into which the part is to be placed. Force control is used to carefully probe until the part is determined to be at least partly aligned with the slot. Force (and/or torque) control are used to more completely insert the part into the slot.

FIG. 1A is a block diagram illustrating an embodiment of a robotic kitting machine. In the example shown, system 100 includes a robotic arm 102 rotatably mounted on a carriage 104 configured to translate along a rail 106. For example, carriage 104 may include a computer-controlled mechanical and/or electro-mechanical drive mechanism configured to be used, under robotic/computer control, to move the carriage 104 along rail 106, for example to reposition the robotic arm 102 to a desired position. In this example the robotic arm 102 is movably mounted on carriage 104 and rail 106, but in various other embodiments robotic arm 102 may be stationary or may be a fully or partly mobile other than via translation along a rail, e.g., mounted on a carousel, fully mobile on a motorized chassis, etc.

In the example shown, robotic arm 102 has an end effector 108 at its operative distal end (furthest from the carriage 104). End effector 108 comprises compliant vacuum (or "suction") cups 110. In various embodiments, suction cups 110 comprise silicone or another natural or synthetic material that is durable but also compliant enough to "give" at least slightly when they (first and/or gently) come in contact with an item the robotic system 100 is attempting to use robotic arm 102 and end effector 108 to grasp.

In this example, the end effector 108 has a camera 112 mounted on the side of the end effector 108. In other embodiments, the camera 112 may be located more centrally, such as on the downward-facing face of the body of end effector 108 (in the position and orientation shown in FIG. 1A). Additional cameras may be mounted elsewhere on robotic arm 102 and/or end effector 108, e.g., on arm segments comprising robotic arm 102. Additionally, cameras 114 and 116, mounted on a wall in this example, provide additional image data usable to construct a 3D view of the scene in which system 100 is located and configured to operate.

In various embodiments, robotic arm 102 is used to position the suction cups 110 of end effector 108 over an item to be picked up, as shown, and a vacuum source provides suction to grasp the item, lift it from its source location, and place it at a destination location.

In the example shown in FIG. 1, robotic arm 102 is configured to be used to pick items from source receptacles 118 and place each item in a corresponding location in a destination receptacle 120. In various embodiments, the system 100 assembles kits each in a corresponding receptacle, such as receptacle 120. The system 100 receives manifests, invoices, or other data indicating which items to draw from which of the source receptacles 118 to assemble kits in receptacles such as destination receptacle 120. The receptacles 118 and/or 120 may be pushed into position by human workers and/or other robots (not shown in FIG. 1A). Additional source receptacles 118 may be moved into place, for example, as kits are assembled and previously-placed receptacles 118 are emptied and/or to make additional items and/or items of a different type, color, etc. available to be included in kits being assembled by system 100.

In various embodiments, 3D or other image data generated by one or more of cameras 112, 114, and 116 may be used to generate a 3D view of the work area of system 100 and items within the work area. The 3D image data may be used to identify items to be picked/placed, such as by color, shape, or other attributes. In various embodiments, one or more of cameras 112, 114, and 116 may be used to read text, logos, photos, drawings, images, markings, barcodes, QR codes, or other encoded and/or graphical information or content visible on and/or comprising items within the work area of system 100.

Referring further to FIG. 1A, in the example shown system 100 includes a control computer 122 configured to communicate, in this example via wireless communication (but in one or both of wired and wireless communication in various embodiments) with elements such as robotic arm 102, carriage 104, effector 108, and sensors, such as camera 112, 114, and 116 and/or weight, force, and/or other sensors not shown in FIG. 1A. In various embodiments, control computer 122 is configured to use input from sensors, such as camera 112, 114, and 116 and/or weight, force, and/or other sensors not shown in FIG. 1A, to view, identify, and determine one or more attributes of items to be loaded into and/or unloaded from trays 120 to trays 118. In various embodiments, control computer 122 uses item model data in a library stored on and/or accessible to control computer 122 to identify an item and/or its attributes, e.g., based on image and/or other sensor data. Control computer 122 uses a model corresponding to an item to determine and implement a plan to stack the item, along with other items, in/on a destination, such as trays 118. In various embodiments, the item attributes and/or model are used to determine a strategy to grasp, move, and place an item in a destination location, e.g., a determined location at which the item is determined to be placed as part of a planning/replanning process to stack items in/on the trays 118.

In the example shown, control computer 122 is connected to an "on demand" teleoperation device 124. In some embodiments, if control computer 122 cannot proceed in a fully automated mode, for example, a strategy to grasp, move, and place an item cannot be determined and/or fails in a manner such that control computer 122 does not have a strategy to complete picking and placing the item in a fully automated mode, then control computer 122 prompts a human user 126 to intervene, e.g., by using teleoperation device 124 to operate one or more of the robotic arm 102, carriage 104, and/or end effector 108 to grasp, move, and place the item.

Figure 1B:
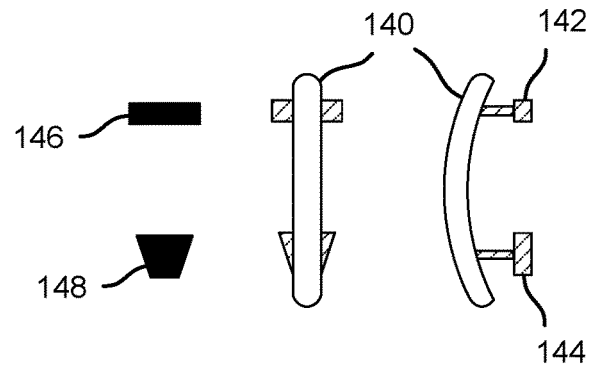
FIG. 1B is a diagram illustrating an example of a part that may be picked and placed in connection with a kitting operation in an embodiment of a robotic kitting system.

FIG. 1B is a diagram illustrating an example of a part that may be picked and placed in connection with a kitting operation in an embodiment of a robotic kitting system. In various embodiments, FIG. 1B illustrates an irregularly-shaped component part or other subassembly that may be picked and placed by a robotic kitting system as disclosed herein, such as robotic kitting system 100 of FIG. 1A, such as to assemble kits by picking items from source receptacles and placing each in a corresponding location in a destination receptacle. In the example shown in FIG. 1B, the item includes a handle 140 and pedestals 142, 144 terminating in structures to mount the handle 140 on another structure. For example, the part shown in FIG. 1B may be a door handle, such as for a car door, or some other handle.

Each of the pedestal portions 142, 144 has a specific shape that in this example fits snugly in a corresponding receiving cavity 146, 148 of a destination receptacle, such as receptacle 120 of FIG. 1A. In various embodiments, a destination receptacle may include a foam or other insert that defines specific locations for each of a plurality of parts. In various embodiments, a robotic kitting system as disclosed herein uses one or more of position control and force control to place each item in a corresponding defined location in a destination receptacle. The location for each item may be defined by one or more cavities in a protective material, such as a foam insert, dividers (e.g., cardboard, plastic, etc.). In various embodiments, position control is used to position each item in proximity to its destination slot or other location, and force control primitives are used to align (or verify alignment of) the respective structures of the item with corresponding cavities in the destination location of the item and to "slot" or insert the item into its location. In various embodiments, the force control ensures that the slot located and the part aligned and inserted into the slot with force sufficient to overcome friction and insert the item despite tight tolerances, all without damaging either the receptacle (e.g., due to damage to the foam or other insert) or the item.

Figure 2A:
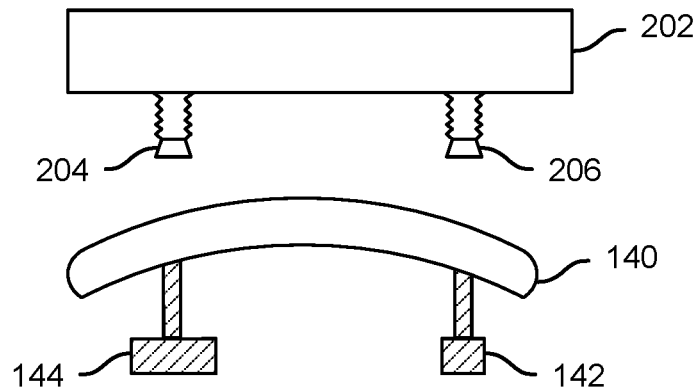
FIG. 2A is a diagram illustrating an example of a correspondence of structures of a suction-type end effector and a manipulated item in an embodiment of a robotic kitting system.

FIG. 2A is a diagram illustrating an example of a correspondence of structures of a suction-type end effector and a manipulated item in an embodiment of a robotic kitting system. In the example shown, a suction-based end effector 202 includes suction cups 204 and 206. The mechanical, suction hose, and electrical or other connections to end effector 202 are not shown in FIG. 2A for clarity. Suction cups 204 and 206 in this example are bellows-type suction cups. The bellows of such a suction cup in various embodiments facilitate engagement with curved, pliable, and other harder to grasp surfaces without restricting suction flow through the suction cup 204, 206. In the example shown, suction cups 204 and 206 are positioned on end effector 202 at locations such that they align with pedestals 142 and 144 attached to handle 140. In various embodiments, end effector suction cups may be aligned with corresponding structures of an item to be picked and placed using a robotic kitting system as disclosed herein. Such alignment facilitated picking/placement, such as by aligning forces applied to an item with the structures that may be required to be extracted from a source slot (e.g., a cavity in a protective insert of a source receptacle) and/or inserted into a destination slot (e.g., a cavity in a protective insert of a destination receptacle).

Figure 2B:
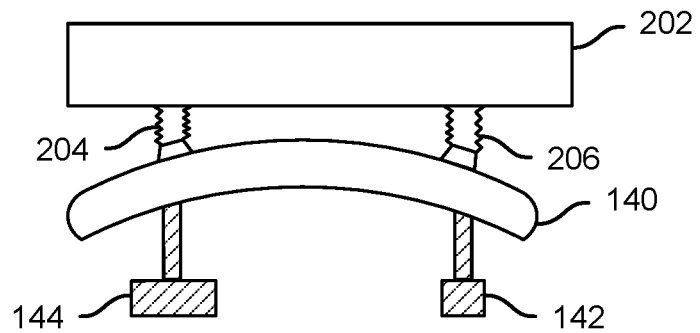
FIG. 2B is a diagram illustrating an example of a correspondence of structures of a suction-type end effector and a manipulated item in an embodiment of a robotic kitting system.

FIG. 2B is a diagram illustrating an example of a correspondence of structures of a suction-type end effector and a manipulated item in an embodiment of a robotic kitting system. In the example and state shown, the end effector 202 and suction cups 204 and 206 have been engaged with the handle 140 at a location that aligns the suction cups 204 and 206 with corresponding pedestals 144, 142.

Figure 2C:
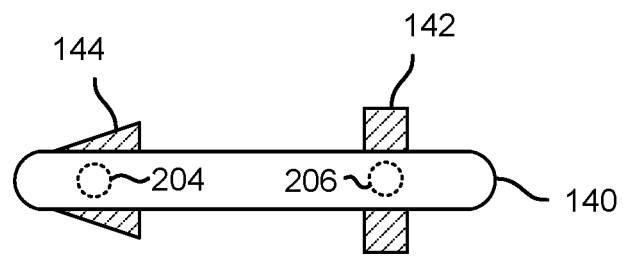
FIG. 2C is a diagram illustrating an example of a correspondence of structures of a suction-type end effector and a manipulated item in an embodiment of a robotic kitting system.

FIG. 2C is a diagram illustrating an example of a correspondence of structures of a suction-type end effector and a manipulated item in an embodiment of a robotic kitting system. In FIG. 2C, the body portion of end effector 202 is not shown, for clarity, and in the top view shown the alignment of suction cups 204 and 206 with pedestals 144 and 142, respectively, is illustrated.

In various embodiments, a control computer comprising a robotic kitting system as disclosed herein uses a suction-based end effector, such as end effector 202 of FIGS. 2A through 2C, to grasp an item. The control computer may operate the robotic arm to which the end effector is attached (not shown in FIGS. 2A through 2C) to position the end effector 202 above the item to be grasped, as shown in FIG. 2A, and to approach the item (e.g., door handle 140) with a vertical downward approach. Force control, e.g., force and/or torque sensors embodied in the end effector, robotic arm, and/or the wrist mechanism by which the end effector is affixed to the robotic arm, may be used to detect that the suction cups (e.g. 204, 206) of the end effector have come in contact with the item to be grasped, and/or to ensure that excessive force, such as a force likely to result in damage to the item, is not applied. Pressure sensors may be used to ensure the suction cups are placed one the surface of the item in a location such that suction adequate to lift and move the item can be achieved. For example, the control computer may make small adjustments to the orientation and position of the end effector to achieve suction sufficient to lift the item.

FIG. 3 is a flow diagram illustrating an embodiment of a process to perform a robotic kitting operation. In various embodiments, the process 300 of FIG. 3 is performed by a computer, such as control computer 122 of FIG. 1. In the example shown, at 302, a manifest or other data indicating high level objectives, such as which kits are to be assembled and which parts are to be included in each kit, and workspace context information, such as which source and destination receptacles are in which location in the workspace and which items are present in each respective receptacle, are received. The workspace context information may be provided as input, such as by a human user, and/or may be determined by the robotic kitting system, such as by using image data generated by cameras in the workspace, such as cameras 114, 116 of FIG. 1A; by using optical, RF, or other scanners to identify receptacles in the workspace and/or items within receptacles; etc. At 304, a plan is generated to pick/place items to fulfill requirements, such as requirements defined by the manifests or other data received at 302. For example, the control computer 112 of FIG. 1, or another computer, may use the manifest (or other) and context data received at 302 to generate without human intervention a plan to pick items from source receptacles to destination receptacles, such as to assemble a series of kits in an order and manner prescribed by the manifest or other requirements data. At 306, items are picked and placed, according to the plan generated at 304, to assemble kits to fulfill the requirements received at 302 considering the context received/determined at 302.

In various embodiments, successive iterations of one or more of steps 302, 304, and/or 306 may be performed. For example, a first set of kits may be assembled to fulfill a first part of a high-level objective and/or plan. Subsequently, source receptacles emptied by the robotic kitting system to assemble a first set of kits may be removed from the workspace, e.g., by human and/or other robotic workers, and replaced by other source receptacles. A further iteration of 302 and/or a part thereof may be performed, e.g., to determine the new/current workspace context, and a further/next plan may be generated at 304 and implemented at 306 to assemble a next set of kits. Subsequent iterations of one or more of the steps 302, 304, and/or 306 of the process 300 may be performed, as needed, until all requirements have been fulfilled.

FIG. 4 is a flow diagram illustrating an embodiment of a process to place items in corresponding locations in a receptacle. In various embodiments, the process 400 of FIG. 4 is performed by a computer, such as control computer 122 of FIG. 1. The process 400 may be performed to pick/place items, as in step 306 of the process 300 of FIG. 3. In the example shown in FIG. 4, at 402 a next item is picked from a source receptacle. For example, a robotic arm and end effector may be used to grasp an item, as in the example shown in FIGS. 2A through 2C. At 404, position control is used to move the item to the vicinity of a destination location, such as a corresponding slot in a destination receptacle, in which the item grasped at 402 is to be placed. Image data, such as generated by cameras in the workspace (e.g., cameras 114, 116 of FIG. 1A) may be used to generate a three-dimensional view of the workspace, and at 404 the three-dimensional view may be used to move the items grasped at 402 to a corresponding slot in a destination receptacle. At 406, force control is used, as need, to align the item with its corresponding slot and to slide the item into the slot.

In various embodiments, a control computer comprising and/or otherwise associated with a robotic kitting system as disclosed herein may execute or one or more force control primitives, at 406, to align an item with and slide the item into a corresponding destination slot. For example, a first force control primitive may enable the robotic kitting system to detect that an item has come into contact with a top surface of a foam or other insert that defines destination slots of a destination receptacle. The force control primitive may cause the control computer to stop advancing the item and perform one or more operations to locate the slot. For example, the control computer may apply one or more search algorithms or techniques to find the slot, which may themselves use one or more force control primitives. In some embodiments, force and torque readings may be used to detect an extent to which the item or a portion thereof may be aligned or nearly align with an associated part of the destination slot. For example, a peg/pedestal nearly aligned with a cavity into which it is to be inserted may be subject to less resistive force and/or somewhat higher torque than if the structure were more fully not in alignment and being pushed back against more forcefully (higher force) and more evenly (less torque) than if it were partially and/or (more) nearly aligned.

Depending on the information sensed upon initial approach to the destination slot, in various embodiments, one or more (other) force primitives may be invoked to (better or more fully) locate and align the item with the destination slot. For example, in some embodiments, if force and/or torque readings suggest one of a plurality of protrusions each of which is to be inserted into a corresponding cavity is partly aligned with its slot, then the system invokes a force control primitive to first more fully align that part of the item with its slot, e.g., by slightly adjusting the orientation of the item to disengage other protrusions from the foam or other insert that defines the cavities (slots) in the destination receptacle. Once the first part of the item is aligned and has been slid partly into its slot, the orientation is adjusted, e.g. made parallel to the destination receptacle, effectively using the alignment achieved for the first protrusion to line other parts of the item up with their respective slots/cavities. The part may then be slid more fully into the destination location, using force control, for example, or a combination of force control and position control, to detect when the item has been slid fully into the slot. For example, if a force pushing back on the item is detected and the vertical height of the end effector is a height associated with having placed the item fully into the slot, the control computer may determine the item has been slotted successfully.

Other examples of force control primitives include, without limitation, primitives to use force control to find and place an item snugly into a corner location, e.g., in a destination receptacle; to place an item in a location adjacent to one or more previously-placed items; to detect based on sensed force that a bin is misaligned and/or rotated 180 degrees from what was expected; etc.

FIGS. 5A through 5D show a sequence of states illustrating placement of an item in a corresponding location in a receptacle in an embodiment of a robotic kitting system. In various embodiments, a control computer comprising or otherwise associated with a robotic kitting system as disclosed herein, such as control computer 122 of FIG. 1A, may implement force control-based slotting as illustrated by the example shown in FIGS. 5A through 5D.

In the example shown, handle 140 with pedestals 142 and 144 is to be inserted into a destination slot comprising cavities 146 and 148. Cavity 146 is shaped to receive pedestal 142 and cavity 148 is shaped to receive pedestal 144. The shapes and tolerances are such that even slight misalignment would prevent the pedestals 142, 144 from being inserted into the corresponding cavities 146, 148.

Figure 5A:
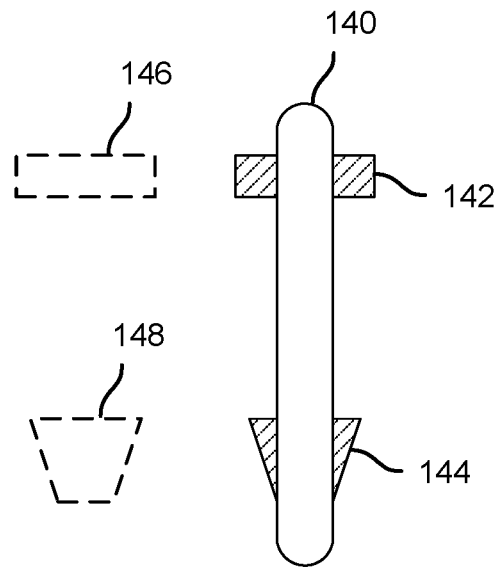
FIGS. 5A through 5D show a sequence of states illustrating placement of an item in a corresponding location in a receptacle in an embodiment of a robotic kitting system.
Figure 5B:
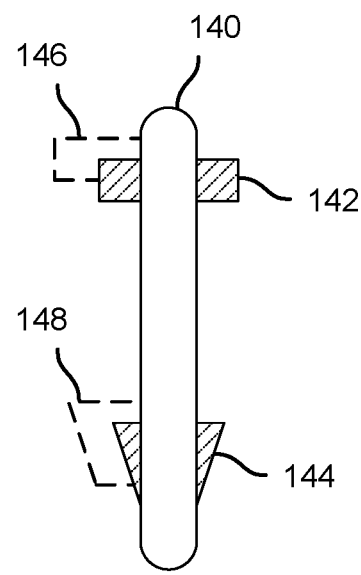
Figure 5C:
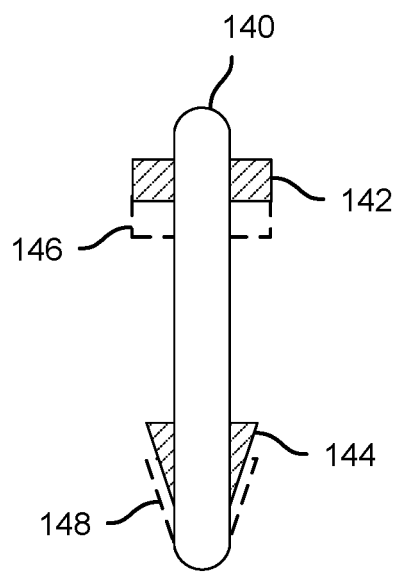

In the position shown in FIG. 5A, the handle 140 has been moved into a position in proximity to the destination slot comprising cavities 146, 148, but entirely out of alignment with the cavities 146, 148. In various embodiments, the system would detect a complete misalignment, as in FIG. 5A, by detecting a maximum magnitude of evenly distributed opposed force, e.g. to a downward vertical movement of the end effector. FIG. 5B shows an initial position to which the handle 140 may be moved in proximity to the destination slot comprising cavities 146, 148, e.g., by position control. In the position shown in FIG. 5B, an attempt to insert the handle 140 into the slot, e.g. by downward vertical motion, would meet with opposing forces as a result of the pedestals 142, 144 contacting the surface of the foam or other material defining the cavities 146, 148. FIG. 5C illustrates a different initial location to which the handle 140 may be moved, e.g., by position control. In the example shown in FIG. 5C, the longitudinal axis of handle 140 is aligned with the corresponding centerline of the slot comprising cavities 146 and 148.

In various embodiments, the misalignments shown in FIGS. 5A, 5B, and 5C, respectively, each would result in a different set of force and torque sensor readings, each set of readings being characteristic of that position of the handle 140 relative to the slot.

Figure 5D:
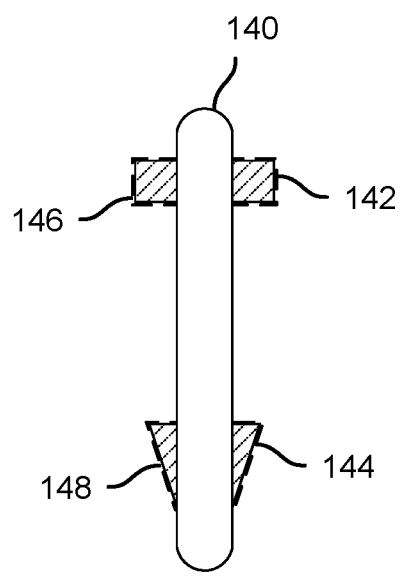

In various embodiments, a robotic kitting system as disclosed herein uses force control to find a slot and insert an item, as illustrated in FIG. 5D, once the item has been moved, e.g., using position control, to the vicinity of the slot, as in FIGS. 5A, 5B, and 5C. Force and torque readings are used, in various embodiments, along with one or more force control primitives, to search of a position and orientation that reduces of eliminates forces and/or torques opposing insertion.

In one approach, once close to the slot the robotic arm may be used to move the item in the plane of the destination receptacle (e.g., x- and y-axes), simultaneously recording force sensing and position. The force sensor signal is filtered, and the search algorithm detects when the force signal decreases below 1N, indicating the item is on top of slot and not on foam (no upward force present). When the drop of force occurs, the associated position of the robot at this change is recalled and the robot is moved towards this location. Insertion of item is then activated by commanding the robot to go down until a force threshold is felt and correction of any tilt is performed. Position of the height of the robot is checked to corroborate item is fully within the slot.

In another approach, the item is moved in the plane of the destination receptacle while continuously pressing down with an oscillating down/upward force. On top of this, another force control is active detecting any forces that are opposing the direction of movement and the system proportionally compensates for the opposing forces (impedance control). This will align item with the cavities defining the slot and subsequently a correction of the tilt is performed by changing the tilt of the robot. As above, position of the height of the robot is checked to corroborate item is fully within the slot.

In various embodiments, controllers are implemented in a hierarchical manner, as follows: 1) downward force 2) Cartesian position (x, y, z motion) and impedance force control, and 3) orientation control (guarantee to maintain end effector orientation at all times).

Figure 6A:
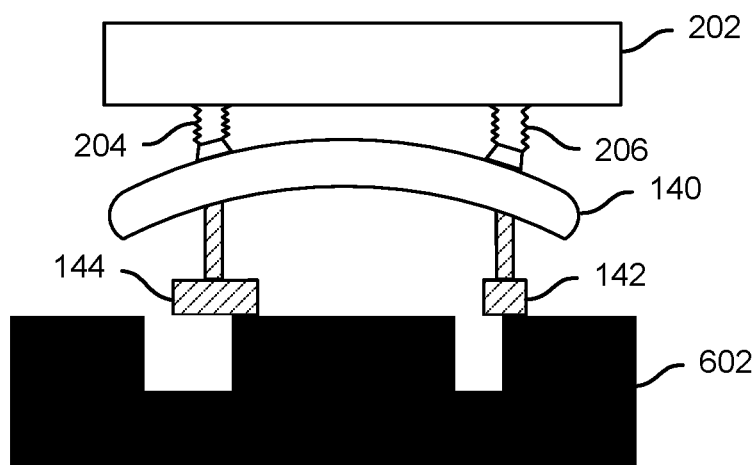
FIGS. 6A through 6C show a sequence of states illustrating placement of an item in a corresponding location in a receptacle in an embodiment of a robotic kitting system.
Figure 6B:
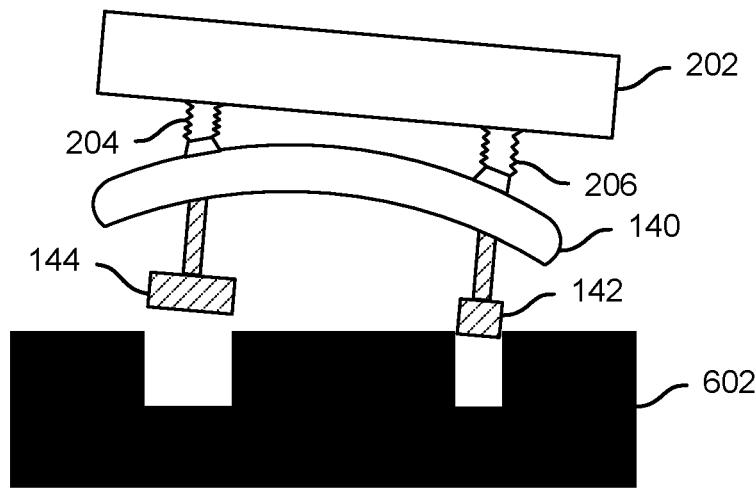
Figure 6C:
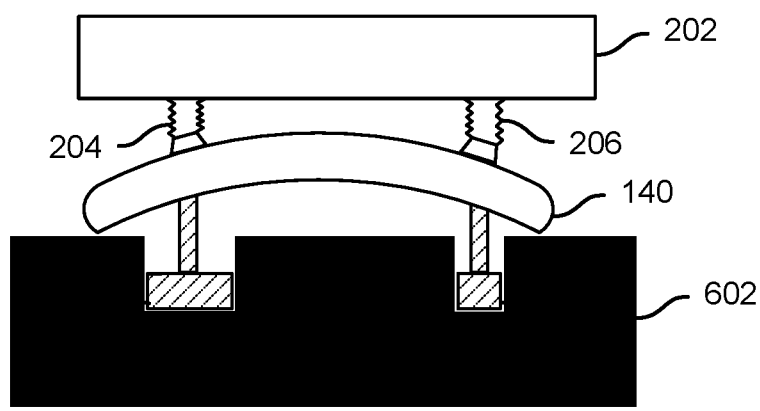

FIGS. 6A through 6C show a sequence of states illustrating placement of an item in a corresponding location in a receptacle in an embodiment of a robotic kitting system. In the example shown, end effector 202 has used suction cups 204 and 206 to grasp handle 140 comprising pedestals 142 and 144 and has used position control to move the handle to the position shown in FIG. 6A. In the position shown in FIG. 6A, the pedestals 142 and 144 are offset from the corresponding cavities in foam insert 602 into which they are to be inserted, e.g., cavities 146 and 148 of FIGS. 5A through 5D. In various embodiments, a robotic kitting system as disclosed herein detects the misalignment as shown in FIG. 6A. In some embodiments, the robotic kitting system may determine, e.g., based on detected forces and/or torques, that the pedestals 142 and 144 are partly aligned with the respective corresponding cavities. In this example, the system tilts the end effector 202 (and structures comprising and/or in the grasp of the end effector) as shown in FIG. 6B, using force control to keep pedestal 142 engaged (i.e., in contact) with foam insert 602. One or more search strategies, e.g., as described above, are used by the system to align the pedestal 142 with its corresponding cavity, as shown in FIG. 6B. Once the pedestal 142 has been determined to be aligned with its corresponding cavity, the system changes the orientation of end effector 202 and uses vertical downward motion to insert the pedestals 142, 144 each into its corresponding cavity.

FIGS. 7A through 7C illustrate placement of an item in a corresponding location in a receptacle in an embodiment of a robotic kitting system. In the example shown, as illustrated in FIG. 7A, a first destination receptacle 702 is aligned with an expected orientation denotes by axis $y_0$ but a second destination receptacle 704 is aligned with an axis $y_{new}$ that is offset from the expected orientation axis $y_0$. As shown in FIG. 7B, in various embodiments, a robotic kitting system as disclosed herein, expecting the destination receptacle 704 to be align with expected $y_0$ axis, may initially move an item such as handle 140 to a position as shown in FIG. 7B. The system would expect the longitudinal axis of handle 140 to be aligned with the orientation of the slot defined by cavities 146 and 148, to facilitate insertion of. In various embodiments, a robotic kitting system as disclosed herein uses force control to find and align the pedestals 142 and 144 with the cavities 146 and 148, thereby discovering the true orientation of the destination receptacle 704 on axis $y_{new}$. In various embodiments, a robotic kitting system as disclosed herein, upon learning the true orientation the destination receptacle 704, on axis $y_{new}$ in this example, remaps the position of other slots in the destination receptacle 704, increasing the accuracy, speed, and efficiency of subsequent operations to insert other items into remaining slots in the destination receptacle 704.

FIG. 7D is a flow diagram illustrating an embodiment of a process to place items in corresponding locations in a receptacle in an embodiment of a robotic kitting system. In various embodiments, the process 720 of FIG. 7D is implemented by a control computer or other computer comprising and/or associated with a robotic kitting system as disclosed herein, such as control computer 122 of FIG. 1A. In the example shown, at 722, an indication is received that destination receptacle alignment is not as expected, e.g., as described above in connection with FIGS. 7A through 7C. At 724, the system updates a spatial mapping (e.g., location coordinates and/or orientation of destination slots, to reflect the true orientation that has been determined for the receptacle.

FIGS. 8A through 8E illustrate placement of an item in a corresponding location in a receptacle in an embodiment of a robotic kitting system. In the example shown, in the position shown in FIG. 8A, initially the handle 140, 142, 144 is fully not aligned with the cavities 146, 148. A robotic kitting system as disclosed herein may use force control, as disclosed herein, to attempt to locate the slot 146, 148 and insert the handle 140, 142, 144 into the slot. However, as shown in FIG. 8B, if the slot is directional, as in this example, and the destination receptacle is flipped around the opposite way than as expected, in some embodiments, the system will not be able to slot the item using force control. For example, the system may not be able to find a position in which the forces opposing vertical downward motion are zero or at some other minimum level associated with successfully slotting the item.

In various embodiments, a robotic kitting system as disclosed herein is configured to detect, e.g., by interpreting the forces detected in the condition as shown in FIG. 8B, that the receptacle is flipped around. As shown in FIG. 8C, the system reorients its understanding of the position of slots in the destination receptacle from the positions as shown in 802a to those as shown in 802b. As shown in FIGS. 8D and 8E, the system concludes based on the new mapping that the item, destined for slot/position "1" in this example (upper left corner as shown in 802*a*) but initially attempted to be inserted in an inverted orientation into slot 8 (upper left corner as shown in 802*b*), must be raised, flipped around 180 degrees, as shown in FIG. 8D, and moved to the opposite corner (or other remapped) location in the receptacle, and then inserted (e.g., using force control, as described above) in the originally intended location, the true position and orientation of which have been discovered as described above, as shown in FIG. 8E.

Using techniques disclosed herein, items may be picked and place to assemble kits, such as in a manufacturing, shipping, or other operation, using a robotic kitting system as disclosed herein to ensure quick, efficient, accurate, and safe handling of parts to assemble kits.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A robotic system, comprising:
a communication interface; and
a processor coupled to the communication interface and configured to:
control a robotic arm having an end effector to move an item having at least a first pedestal portion to a location associated with a slot into which the first pedestal portion of the item is to be inserted;
receive via the communication interface force information generated by a force sensor, wherein the force information includes forces detected by the force sensor;
use the force sensor information to align the at least first pedestal portion with a corresponding cavity comprising the slot;
determine based at least in part on the detected forces that a destination receptacle with which the location and the slot are associated is at a detected orientation that is different than an expected orientation;
determine an actual orientation of the slot based the detected forces;
remap position information for one or more other slots comprising the destination receptacle based at least in part on the determined actual orientation of the slot; and
control the robotic arm to insert the item into the slot.

2. The robotic system of claim 1, wherein the processor is further configured to cause the robotic arm to grasp the item from a source receptacle.

3. The robotic system of claim 1, wherein the processor is further configured to receive a high-level objective and generate and implement a plan to achieve the high-level objective, including by moving the item to the location.

4. The robotic system of claim 1, wherein the processor is configured to cause the end effector to move the item to the location using position control.

5. The robotic system of claim 1, wherein the slot is included in the destination receptacle.

6. The robotic system of claim 5, wherein the corresponding cavity comprises a cavity defined in a substrate.

7. The robotic system of claim 6, wherein the substrate comprises a foam or other insert.

8. The robotic system of claim 7, wherein the cavity comprises a first cavity and the substrate includes one or more other cavities comprising the one or more other slots.

9. The robotic system of claim 8, wherein at least the first cavity has a shape or dimension that differs from the one or more other cavities.

10. The robotic system of claim 1, wherein the processor is configured to invoke a force control primitive to use the force sensor information to align a structure comprising the item with the corresponding cavity comprising the slot.

11. The robotic system of claim 1, wherein the processor is configured to use the force sensor information to align a structure comprising the item with the corresponding cavity comprising the slot at least in part by causing the end effector to reposition the item to a different location determined by a search algorithm and applying a downward vertical force.

12. The robotic system of claim 1, wherein the detected orientation is approximately 180 degrees different than the expected orientation.

13. The robotic system of claim 1, wherein the processor is configured to cause the end effector to insert the item in the slot at least in part by withdrawing the item, rotating the item 180 degrees, and moving the item to a remapped location associated with the slot.

14. A method, comprising:
controlling a robotic arm having an end effector to move an item having at least a first pedestal portion to a location in proximity to a slot into which the first pedestal portion of the item is to be inserted;
receiving via a communication interface force information generated by a force sensor, wherein the force information includes forces detected by the force sensor;
using the force sensor information to align the at least first pedestal portion with a corresponding cavity comprising the slot;
determining based at least in part on the detected forces that a destination receptacle with which the location and the slot are associated is at a detected orientation that is different than an expected orientation;
determine an actual orientation of the slot based on the detected forces;
remapping position information for one or more other slots comprising the destination receptacle based at least in part on the determined actual orientation of the slot; and
controlling the robotic arm to insert the item into the slot.

15. The method of claim 14, further comprising receiving a high-level objective and generating and implementing a plan to achieve the high-level objective, including by moving the item to the location.

16. The method of claim 14, wherein the item is moved to the location using position control.

17. The method of claim 14, wherein the slot is included in the destination receptacle and the corresponding cavity comprises a cavity defined in a substrate.

18. The method of claim 14, the force sensor information is used to align a structure comprising the item with the corresponding cavity comprising the slot at least in part by repositioning the item to a different location determined by a search algorithm and applying a downward vertical force.

19. The method of claim 14, further comprising invoking a force control primitive to use the force sensor information to align a structure comprising the item with the corresponding cavity comprising the slot.

20. A computer program product embodied in a non-transitory computer readable medium, comprising computer instructions for:

controlling a robotic arm having an end effector to move an item having at least a first pedestal portion to a location in proximity to a slot into which the first pedestal portion of the item is to be inserted;

receiving via a communication interface force information generated by a force sensor, wherein the force information includes forces detected by the force sensor;

using the force sensor information to align the at least first pedestal portion with a corresponding cavity comprising the slot;

determining based at least in part on the detected forces that a destination receptacle with which the location and the slot are associated is at a detected orientation that is different than an expected orientation;

determining an actual orientation of the slot based on the detected forces;

remapping position information for one or more other slots comprising the destination receptacle based at least in part on the determined actual orientation of the slot; and controlling the robotic arm to insert the item into the slot.

* * * * *